US011536262B2

(12) United States Patent
Van Haaren et al.

(10) Patent No.: US 11,536,262 B2
(45) Date of Patent: Dec. 27, 2022

(54) AUTOMATIC SYSTEM PROFILING FOR A WELL SYSTEM

(71) Applicant: AMTROL LICENSING INC., West Warwick, RI (US)

(72) Inventors: Christopher A. Van Haaren, Warwick, RI (US); Michael Cogliati, Warwick, RI (US)

(73) Assignee: AMTROL LICENSING INC., West Warwick, RI (US)

( * ) Notice: Subject to any disclaimer, the term of this patent is extended or adjusted under 35 U.S.C. 154(b) by 521 days.

(21) Appl. No.: 16/046,366

(22) Filed: Jul. 26, 2018

(65) Prior Publication Data

US 2020/0033899 A1 Jan. 30, 2020

(51) Int. Cl.
*F04B 49/02* (2006.01)
*F04B 51/00* (2006.01)
*F04B 11/00* (2006.01)

(52) U.S. Cl.
CPC ........ *F04B 49/022* (2013.01); *F04B 11/0008* (2013.01); *F04B 51/00* (2013.01)

(58) Field of Classification Search
CPC ... F04B 11/00; F04B 11/0016; F04B 11/0025; F04B 11/0008; F04B 17/03;
(Continued)

(56) References Cited

U.S. PATENT DOCUMENTS 5,320,495 A 6/1994 Ralph
2011/0046901 A1* 2/2011 Boissonneau ........... F15B 1/022
702/50
(Continued)

FOREIGN PATENT DOCUMENTS

CN 201835325 U * 5/2011
EP 1528166 5/2005
(Continued)

OTHER PUBLICATIONS

Author: Pentair Title: Adjusting well pump pressure switches Date published (mm/dd/yyyy): May 10, 2006 Date accessed (mm/dd/yyyy ): Sep. 25, 2020 Link: https://www.pentair.com/content/dam/extranet/flow/pressure-switch-adjustment/adjusting-well-pump-pressure-switches.pdf (Year: 2006).*

(Continued)

*Primary Examiner* — Charles G Freay
*Assistant Examiner* — Chirag Jariwala
(74) *Attorney, Agent, or Firm* — Tucker Ellis LLP (57) ABSTRACT

A controller for a well system automatically profiles the system, detects a pre-charge of an associated pressurized storage tank, and automatically configures pressure-based control of a pump based on the detected pre-charge. The controller determines the pre-charge of the pressurized storage tank while the tank is connected to the system. While monitoring a system pressure, the controller activates the pump to initiate a filling operation of the pressurized storage tank. The controller analyzes a change in system pressure during the filling operation to determine the pre-charge of the pressurized storage tank. With the pre-charge determined, the controller automatically configures pressure settings for pressure-based control of the pump.

18 Claims, 7 Drawing Sheets

(58) Field of Classification Search
CPC ........ F04B 23/021; F04B 47/00; F04B 47/06;
F04B 49/02; F04B 49/022; F04B 49/08;
F04B 49/00; F04B 51/00; F04B 2205/06;
F04B 2205/13; F04B 2205/042–0423;
F04B 2205/70–704
USPC .................. 138/26, 30, 31; 417/540, 543
See application file for complete search history.

(56) References Cited

U.S. PATENT DOCUMENTS

2013/0179046 A1* 7/2013 Nassouri ............... F15B 1/08
701/60
2013/0253854 A1* 9/2013 Chen ................... F15B 1/033
702/50
2013/0291952 A1* 11/2013 Zhou ................... F04B 19/00
137/551
2015/0000756 A1* 1/2015 Chen ................... G01N 3/32
137/14
2016/0108607 A1 4/2016 Weinstein

FOREIGN PATENT DOCUMENTS

GN 201835325 5/2011
KR 20160091763 8/2016
KR 101764385 8/2017

OTHER PUBLICATIONS

Catherine Kavanaugh, Plastics News Staff; Phyn JV ready to make splash with smart water device; Plastics News, Mar. 5, 2018; 1 page.
PCT/US20189/043588—Oct. 16, 2019; International Search Report and Written Opinion of the International Searching Authority.

* cited by examiner

AUTOMATIC SYSTEM PROFILING FOR A WELL SYSTEM

TECHNICAL FIELD

This application relates generally to well systems and, more particularly, to an automated technique to determine a pre-charge of a pressurized storage tank in situ.

BACKGROUND

A well system generally includes a water pump that draws water from a well to a plumbing system of a structure. A pressure tank is often utilized to provide water under pressure to the plumbing system to supplement the water pump and also to allow the water pump to run intermittently. Even when the pump is capable of meeting demand, a continuously running pump may have a shorter operational lifetime.

A pressure switch enables the well pump to operate intermittently while also ensuring that the system maintains pressure. The pressure switch is a mechanical device that opens and closes an electrical contact based on a water pressure acting against an input of the pressure switch. The pressure switch is configured to close the electrical contact, and therefore activate the pump, when the pressure acting against the input falls to a predetermined cut-in pressure. Similarly, the pressure switch is configured to open the electrical contact (i.e. turn off the pump) when the pressure acting against the input rises to a predetermined cut-out pressure. The pressure settings of the pressure switch should be established based on a pre-charge pressure of the tank.

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

In various, non-limiting embodiments, an electronic control for a well system detects a pre-charge of an associated pressurized storage tank and automatically configures pressure-based control of a well pump based on the detected pre-charge. The controller determines the pre-charge of the tank while the tank is plumbed into the system. While monitoring a system pressure, the controller activates the well pump to initiate a filling operation of the tank. The controller analyzes a change in system pressure during the filling operation to determine the pre-charge of the tank. With the pre-charge determined, the controller automatically configures pressure settings for pressure-based control of the well pump.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

General Overview

As discussed in the background, mechanical pressure switches are often employed to control operation of a well pump. Such mechanical devices do not provide robust control or protection of the well system. In addition, mechanical pressure switches require physical access to be adjusted. Moreover, for proper adjustment of mechanical switches, a pre-charge pressure of a well tank is manually verified.

In various, non-limiting embodiments, a system and associated methods are provided for automatic sensing of a pre-charge of a well tank of a well system. An electronic controller is provided that is capable of measuring the pre-charge of the well tank while the well tank is coupled to the well system. The controller is further configured to automatically establish operating parameters for pressure-based control of a well pump based the measured pre-charge.

In a further aspect, the controller can verify a remaining pre-charge of the well tank. For instance, the controller can temporarily override normal pressure-based control and monitor a pressure of the system while the well tank is emptied. The remaining pre-charge can be compared to an initial measurement to determine degradation of the pre-charge.

In one embodiment, a method for sensing a pre-charge of a pressurized storage tank is provided. The method can include activating a well pump in fluid communication with the pressurized storage tank to initiate a filling operation. The method can also include monitoring a change of fluid pressure of the pressurized storage tank during the filling operation. The method can further include detecting a step change in the fluid pressure and recording a pressure value at the step change as the pre-charge of the pressurized storage tank.

According to various examples of this embodiment, the pressure value at an upper end of the step change is recorded as the pre-charge. The method can also include configuring pressure settings for a normal operation of the pump based on the pre-charge. The pressure settings may specify a cut-in pressure and a cut-out pressure for the pump. The cut-in pressure may be approximately 2 psig above the pre-charge and the cut-out pressure may be approximately 22 psig above the pre-charge. The method can also include deactivating the pump and disabling pressure-based control of the pump; monitoring a rate of change of fluid pressure of the pressurized storage tank while the tank is emptying; detecting when the rate of change of fluid pressure falls below a threshold; and recording a pressure value when the threshold is met as a remaining pre-charge of the pressurized storage tank. The method may also include comparing the remaining pre-charge against a previous pre-charge to measure pre-charge degradation. The pressurized storage tank remains coupled to a plumbing system during pressure monitoring.

In accordance with another embodiment, a controller for a well system is provided. The controller may include a processor; an interface for operatively coupling the processor to a pump; and a computer-readable storing computer-executable instructions. The computer-executable instructions, when executed, configure the processor to: activate the pump via the interface to initiate a filling operation of a pressurized storage tank in fluid communication with the pump; receive pressure readings from a pressure sensor during the filling operation, the pressure sensor is configured to measure a fluid pressure of the pressurized storage tank; detect a step change in the fluid pressure of the pressurized storage tank; and record a pressure value at the step change as a pre-charge of the pressurized storage tank.

According to an example, the computer-executable instructions further configure the processor to establish system settings based on the pre-charge of the pressurized storage tank. The system settings may include a pressure cycle range within which the controller maintains the fluid pressure of the pressurized storage tank. The pressure cycle range may be approximately 2 psig above the pre-charge of the well tank to 22 psig above the pre-charge.

In another example, the computer-executable instructions further configure the processor to: disable pressure-based control of the pump and deactivate the pump; receive pressure readings from the pressure sensor while the pressurized storage tank is emptying; detect when a rate of decrease of the fluid pressure fall below a threshold; and record a pressure value as a remaining pre-charge value when the threshold is reached. The computer-executable instructions further configure the processor to compare the remaining pre-charge value to an initial pre-charge to measure degradation.

In yet another embodiment, a system is provided that includes a tank configured to store a fluid and provide the fluid under pressure to a plumbing system; and a controller configured to control operation of a pump to supply the fluid to one of the tank or the plumbing system. The controller is operatively coupled to the pump and a pressure sensor that provides a pressure reading for the system. The controller is configured to: activate the pump to initiate a filling operation; obtain pressure readings from the pressure sensor to monitor a change of pressure during the filling operation; detect a step change in the pressure; and record a pressure value at the step change as an initial pre-charge of the tank.

In an example, the controller is further configured to establish pressure setpoints for pressure-based pump control based on the initial pre-charge of the tank. The pressure setpoints may include a cut-in pressure and a cut-out pressure for the pump. The controller may set the cut-in pressure to be approximately 2 psig above the initial pre-charge and may set the cut-out pressure to be approximately 22 psig above the initial pre-charge.

In another example, the controller is further configured to: disable pressure-based control of the pump; monitor a rate of change of pressure with the pressure sensor while the tank is emptying; detect when the rate of change falls below a threshold; and record a pressure value when the threshold is reached as a remaining pre-charge of the tank. The controller is further configured to compare the remaining pre-charge with the initial pre-charge to measure pre-charge degradation of the tank.

An overview of some embodiments of a well system has been presented above. As a roadmap for what follows next, the well system, and in particular a controller for the well system, is generally described. The above noted features and embodiments will be described with reference to the drawings, wherein like reference numerals are used to refer to like elements throughout.

Automatic Pre-Charge Sensing and System Profiling

As mentioned above, in various embodiments, a well system can include an electronic controller capable of measuring a pre-charge of a well tank and automatically configuring pressure-based control of a well pump.

Figure 1:
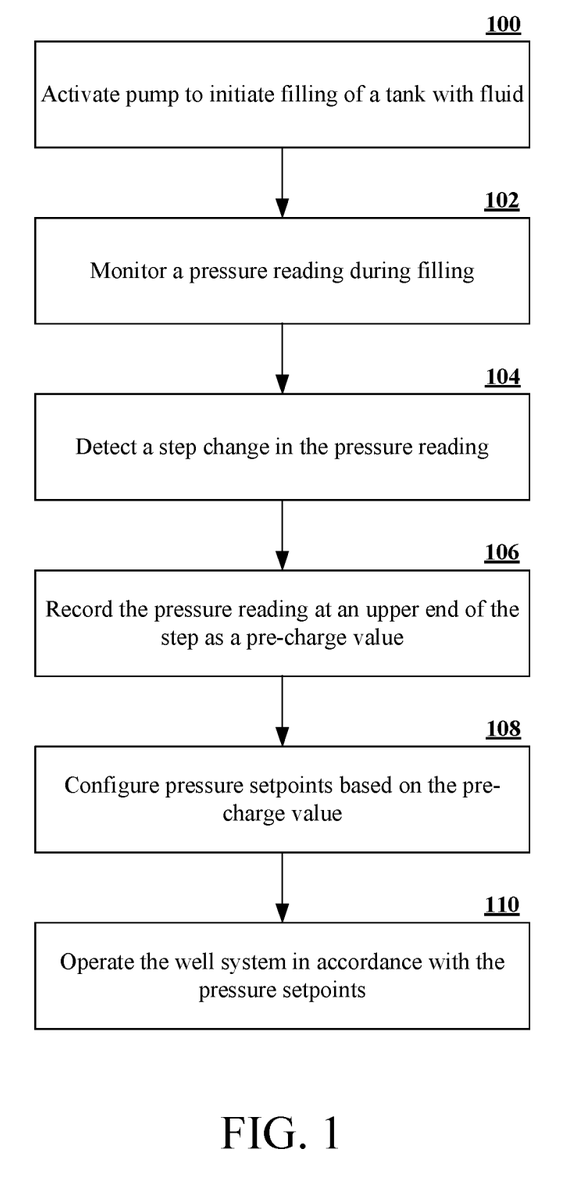
FIG. 1 is a flow diagram of an exemplary, non-limiting embodiment for profiling and configuring a well system including detecting a pre-charge of a tank according to one or more aspects.

FIG. 1 illustrates a flow diagram of an exemplary, non-limiting embodiment for profiling and configuring a system including detecting a pre-charge of a well tank by an electronic controller while the well tank is plumbed into a well system. In an aspect, the embodiment of FIG. 1 can occur when the well system is initially installed and the controller is first powered on. At 100, the controller can activate a well pump to initiate filling of the well tank with fluid. At 102, the controller can monitor a pressure reading from a pressure sensor during the filling operation. For instance, the controller can obtain a series of pressure readings from the pressure sensor at a given sampling frequency and compute a change in pressure or slope over a particular window. Alternatively, the controller can acquire pressure readings at a given frequency and compare a newly acquired pressure with a last received pressure to approximate the change in pressure.

At 104, the controller detects a step change in the pressure. For example, the step change may manifest as a rapid increase or a sharp rise in the pressure reading provided by the pressure sensor. When activated, the pump pushes fluid into the well tank. The fluid entering the well tank pushes against a volume of air within the tank. The volume of air is readily compressed until the pre-charge pressure is reached, which results in the step change. In one aspect, the controller can identify the step change when the computed change in pressure or slope exceeds a predetermined threshold. In another example, the controller may identify an inflection point in the pressure profile, which can indicate the step change.

At 106, the controller records a pressure reading corresponding to the detected step change as a pre-charge value of the well tank. For example, the controller can select the pressure reading acquired at an upper end of the step change. In another example, the controller can record a pressure reading at which the change of pressure falls below the threshold signifying the step change. This point may correspond to a top end of the step change after which the pressure returns to a more steady increase.

At 108, with the pre-charge determined, the controller configures pressure setpoints for a pressure-based control of the pump. In particular, the controller can set a cut-in pressure and a cut-out pressure. Accordingly to one example, the cut-in pressure can be set at 2 psig above the pre-charge and the cut-out pressure can be set to 22 psig above the pre-charge. At 110, the controller can operate the pump in accordance with a pressure reading from the pressure sensor and the pressure setpoints.

Figure 2:
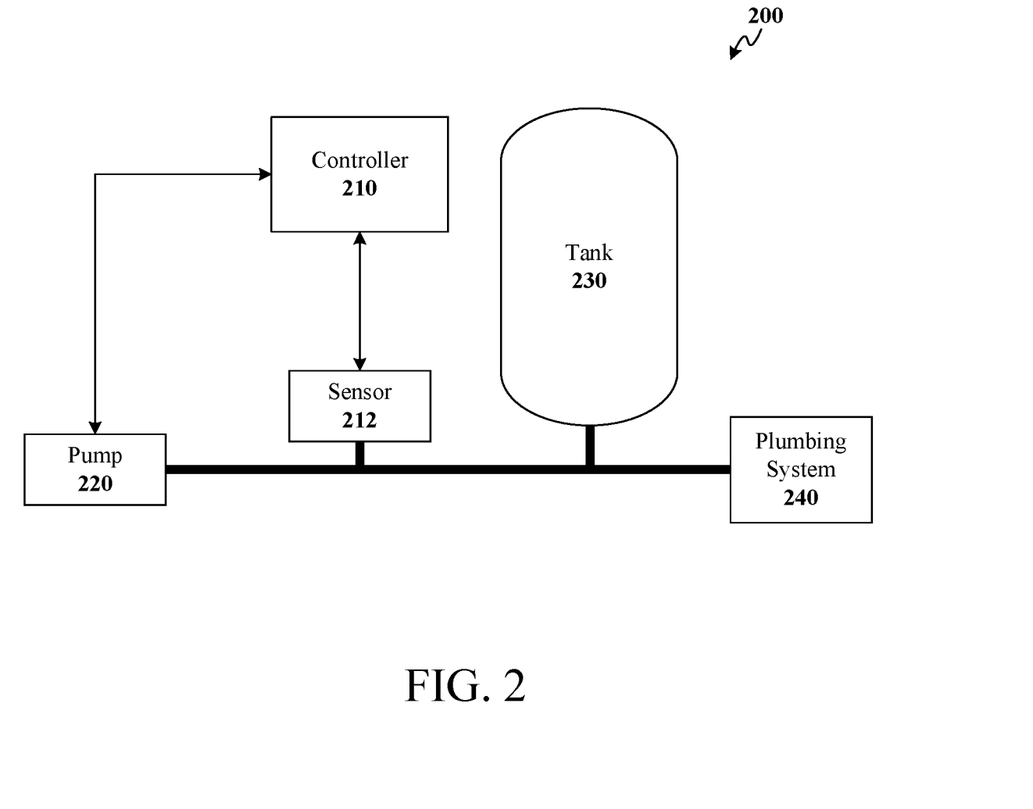
FIG. 2 is a schematic block diagram of an exemplary, non-limiting embodiment of a well system.

Turning to FIG. 2, a schematic block diagram of an exemplary, non-limiting embodiment of a well system 200 is illustrated. System 200 can include a controller 210, which is operatively coupled to a pump 220 for moving a fluid from well. The pump 220 provides the fluid to a well tank 230 and/or a plumbing system 240 (e.g., plumbing of a structure). Under normal operation, controller 210 activates and deactivates pump 220 in accordance with operating parameters established for the system 200. By way of example, the operating parameters can include pressure setpoints as described above.

Controller 210 can acquire pressure readings from a sensor 212. The sensor 212 can be coupled to fluid lines between pump 220 and tank 230 or plumbing system 240. The sensor 212 provides a pressure reading in the fluid lines and communicates the pressure reading to controller 210. In accordance with a normal operating mode, controller 210 activates pump 220 when the pressure reading falls below a cut-in pressure and deactivates pump 1220 when the pressure reading is at or above a cut-out pressure. Although depicted as being separate from controller 210, it is to be appreciated that sensor 212 can be integrated with controller 210. For instance, sensor 212 can be at least partially integrated with a circuit board of controller 210 and/or enclosed within a common housing. Moreover, the common housing that includes the controller 210 and/or sensor 212 may be installed on or attached to the tank 230.

According to an aspect, controller 210 can carry out the method of FIG. 1. That is, controller 210 can activate pump 220 to initiate filling of tank 230. During filling, the controller 210 monitors pressure readings from sensor 212 to detect a step change indicative of the pressure reaching the pre-charge pressure of tank 230. The controller 210 can automatically set the operating parameters (i.e. the cut-in and cut-out pressure) based on the pre-charge pressure sensed during the filling operation.

Figure 3:
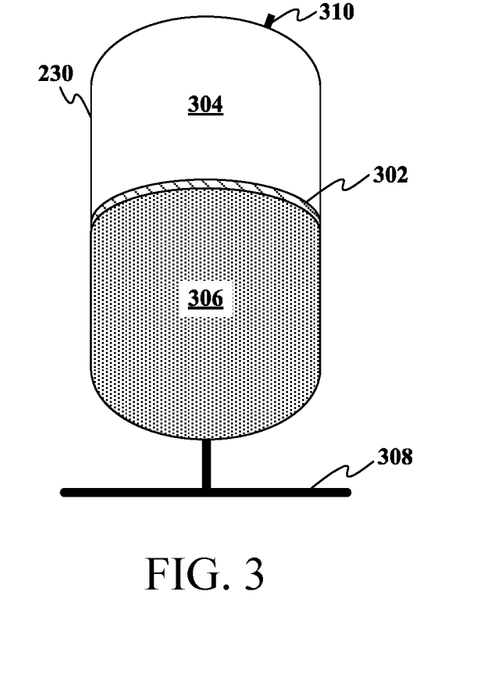
FIG. 3 is a schematic diagram of an exemplary, non-limiting embodiment of a well tank of the well system of FIG. 2.

Turning now to FIG. 3, an exemplary, non-limiting embodiment of the well tank 230 is illustrated as a partial cut-away. The tank 230 can be a pressure vessel having an internal diaphragm 302 that separates an interior volume into an air chamber 304 and a water chamber 306. The air chamber 304 is provided with a pre-charge of air pressure so as to provide fluid under pressure to the plumbing system 240 even when pump 220 is not running. The water chamber 306 is in fluid communication with fluid lines 308 coupled to the plumbing system 240 and pump 220. When activated, the pump 220 pushes fluid into the water chamber 306. The fluid, in turn, pushes against the diaphragm and compresses a volume of air in the air chamber 304. The air chamber 304 is in fluid communication with an air stem 310 via which the pre-charge of tank 230 can be increased or decreased.

Figure 4:
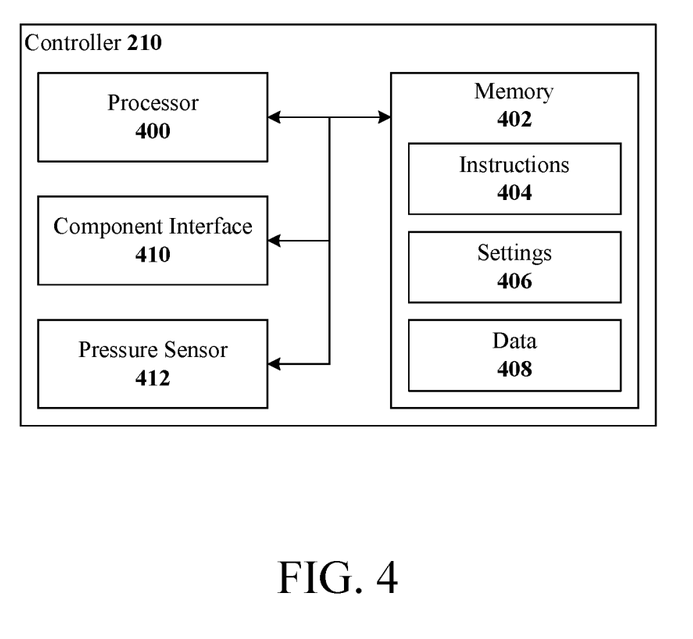
FIG. 4 is a schematic block diagram of an exemplary, non-limiting embodiment of a controller of the well system of FIG. 2.

Turning to FIG. 4, illustrated is a schematic block diagram of an exemplary, non-limiting embodiment for a controller 210. As shown in FIG. 4, controller 210 includes one or more processor(s) 400 configured to execute computer-executable instructions 404 such as instructions for carrying out the method of FIG. 1 and for performing pressure-based control of pump 220. Such computer-executable instructions can be stored on one or more computer-readable media including non-transitory, computer-readable storage media such as memory 402. For instance, memory 402 can include non-volatile storage to persistently store instructions 404, settings 406 (e.g. pressure setpoints), and/or data 408 (e.g., pressure readings from pressure sensor 412, etc.). Memory 402 can also include volatile storage that stores instructions 404, other data (working data or variables), or portions thereof during execution by processor 400.

A component interface 410 is also provided to couple controller 210 to various components of well system 200. For instance, component interface 412 can connect controller 210 to pressure sensor 212, well pump 220, or other devices. Via the component interface 412, the controller 210 can activate pump 220 (i.e. close an electrical switch), deactivate pump 220 (i.e. open the switch), acquire readings from sensor 212, or the like. Accordingly, component interface 412 can include a plurality of electrical connections on a circuit board or internal bus of controller 210 that is further coupled to processor 400, memory 402, etc. Further, the component interface 412 can implement various wired or wireless interfaces such as, but not limited to, a USB interface, a serial interface, a WiFi interface, a short-range RF interface (Bluetooth), an infrared interface, a near-field communication (NFC) interface, etc.

As shown in FIG. 4, the controller 210 can include an integrated pressure sensor 412. Accordingly, the pressure sensor configured to provide a pressure reading of the well system can be included in a common housing with the other components of the controller 210 (i.e. processor 400, memory 404, etc.). However, it is to be appreciated that the pressure sensor may be a separate component coupled to controller 210 via the component interface 410 as shown in FIG. 2, for example.

Figure 5:
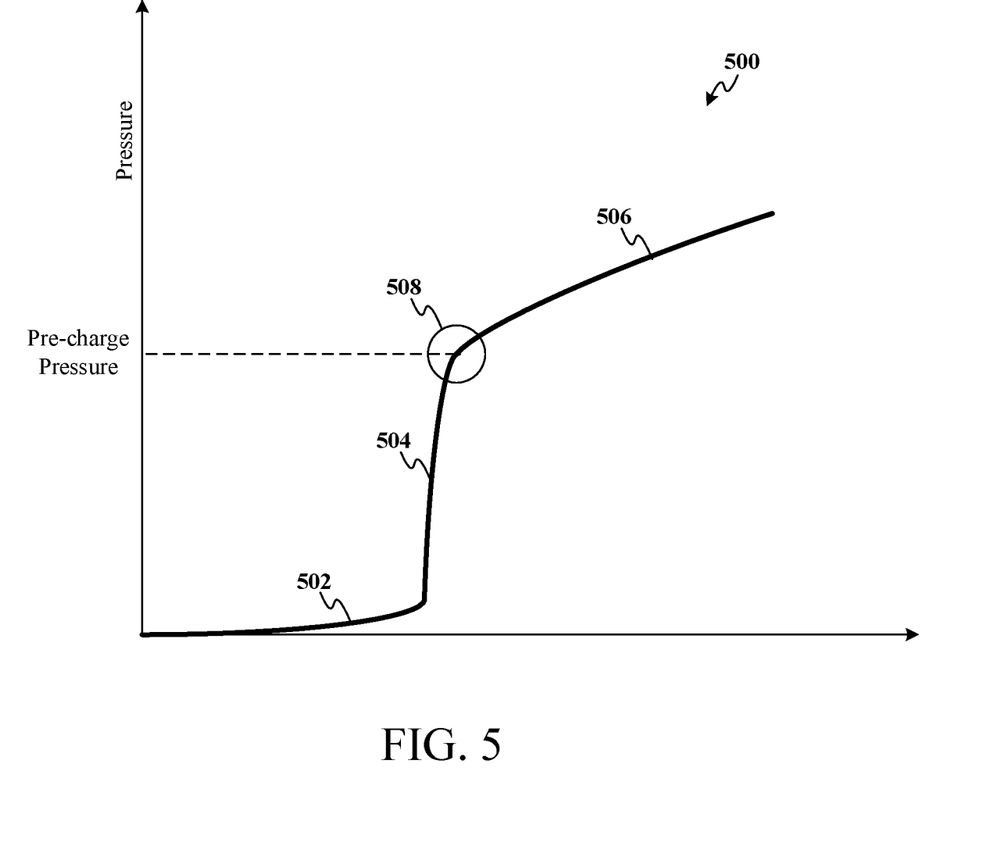
FIG. 5 is an exemplary, non-limiting pressure profile of the well system of FIG. 2 during a filling operation.

Referring now to FIG. 5, illustrated is an exemplary, non-limiting pressure profile 500 of the well system 200 during a filling operation. The pressure profile 500 is based on pressure readings from pressure settings 212 that are monitored by controller 210. The profile includes a portion 502 indicating pressure readings acquired prior to reaching the pre-charge of the tank. The step change 504 is a sharp pressure increase due to the pre-charge being reached and the air volume no longer being easily compressed by incoming fluid. After the pre-charge is reached, the profile 500 returns to a more gradual pressure increase indicated at 506. At an upper end of the step change 504, is a point 508 where the step slop of portion 504 switches to the more gradual slope of portion 506. Point 508 corresponds to a pressure reading recorded by the controller 210 as the pre-charge of the tank.

Figure 6:
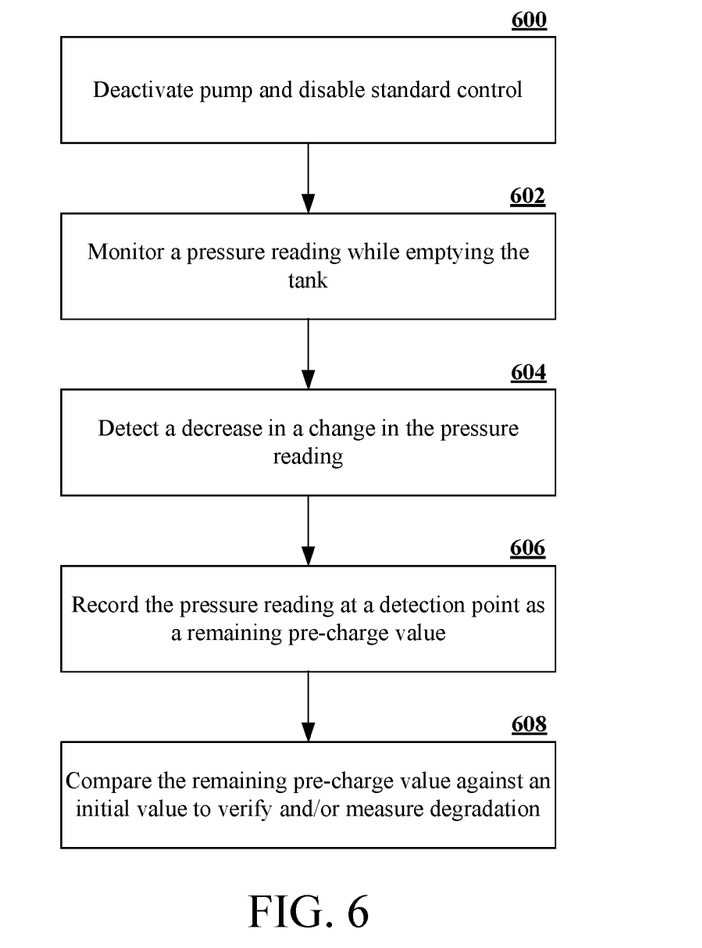
FIG. 6 is a flow diagram of an exemplary, non-limiting embodiment for verifying a remaining pre-charge of a tank.

Turning now to FIG. 6, a flow diagram of a method for verifying a remaining pre-charge of a tank is illustrated. The method of FIG. 6 can be implemented, for example, by controller 210 described above. At 600, a well pump is deactivated and standard control (i.e. pressure-based control) of the well pump is disabled. This action prevents the well pump from activating while an emptying operation is performed on the tank. At 602, pressure readings from a pressure sensor are monitored while the tank is emptied. The controller may utilize similar techniques described above in relation to a filing operation to monitor the pressure during emptying. At 604, while monitoring the pressure readings, a decrease in a change in the pressure reading is detected. For instance, when a computed change in the pressure falls below a predetermined threshold, the decrease is determined to be detected by the controller. In another example, the controller 210 may also detect a step change (i.e. a rapid decrease in the pressure) at 604. At 606, a pressure reading a detection point is recorded as a remaining pre-charge value. At 608, the remaining pre-charge value can be compared to an initial pre-charge value to verify existence of an appropriate pre-charge and/or measure an amount of degradation of the pre-charge.

Figure 7:
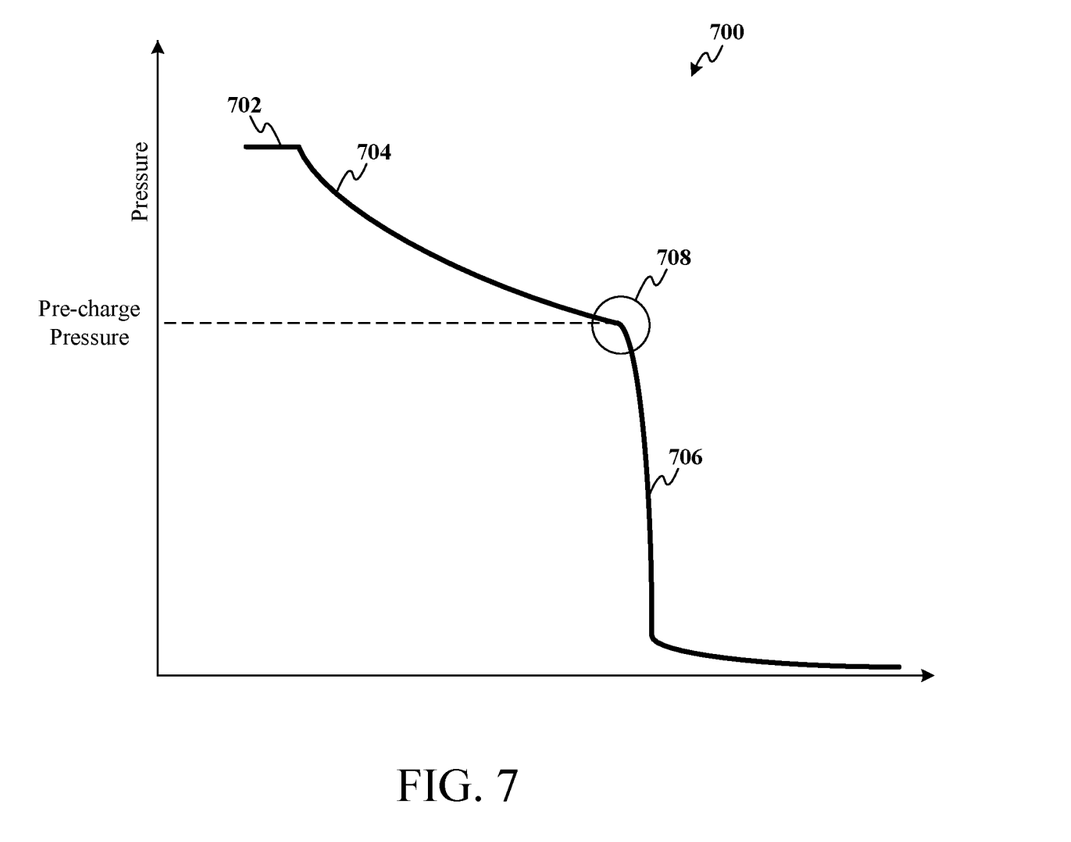
FIG. 7 is an exemplary, non-limiting pressure profile of the well system during an emptying operation.

Referring now to FIG. 7, illustrated is an exemplary, non-limiting pressure profile 700 of the well system 200 during an emptying operation described in FIG. 6. The pressure profile 700 is based on pressure readings from pressure settings 212 that are monitored by controller 210 while tank 230 is emptied. Portion 702 of the profile 700 corresponds to a tank pressure prior to a draw (i.e. opening a faucet). Portion 704 indicates the pressure after the faucet is opened and the pressure in the tank forces water out. The change in the pressure during emptying begins to slow before transitioning into at step down 706 at point 708. As described above, a pressure reading corresponding to point 708 can be stored as a remaining pre-charge value.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for sensing a pre-charge of a pressurized storage tank, comprising:
    activating a well pump in fluid communication with the pressurized storage tank to initiate a filling operation;
    monitoring a change of fluid pressure of the pressurized storage tank during the filling operation;
    detecting a step change in the fluid pressure of the pressurized storage tank, wherein the step change is detected when a rate of change of the fluid pressure exceeds a predetermined rate;
    recording a pressure value at an upper end of the step change as the pre-charge of the pressurized storage tank;
    deactivating the pump and disabling pressure-based control of the pump;
    monitoring a rate of change of fluid pressure of the pressurized storage tank while the pressurized storage tank is emptying;
    detecting when the rate of change of fluid pressure falls below a threshold; and
    recording a pressure value when the threshold is met as a remaining pre-charge of the pressurized storage tank.

2. The method of claim 1, further comprising comparing the remaining pre-charge against the pre-charge of the pressurized storage tank to measure pre-charge degradation of the pressurized storage tank.

3. The method of claim 1, wherein the pressurized storage tank remains coupled to a plumbing system during the pressure monitoring.

4. The method of claim 1, further comprising configuring pressure settings for a normal operation of the pump based on the pre-charge.

5. The method of claim 4, wherein the pressure settings specify a cut-in pressure and a cut-out pressure for the pump.

6. The method of claim 5, wherein the cut-in pressure is 2 psig above the pre-charge and the cut-out pressure is 22 psig above the pre-charge.

7. A controller for a well system, comprising:
    a processor;
    an interface for operatively coupling the processor to a pump; and
    a computer-readable storing computer-executable instructions, that when executed by the processor, configure the processor to:
        activate the pump via the interface to initiate a filling operation of a pressurized storage tank in fluid communication with the pump;
        receive pressure readings from a pressure sensor during the filling operation, the pressure sensor is configured to measure a fluid pressure of the pressurized storage tank;
        detect a step change in the fluid pressure of the pressurized storage tank, wherein the step change is detected when a rate of change of the fluid pressure exceeds a predetermined rate; and
        record a pressure value at an upper end of the step change as a pre-charge of the pressurized storage tank.

8. The controller of claim 7, the computer-executable instructions further configure the processor to:
    disable pressure-based control of the pump and deactivate the pump;
    receive pressure readings from the pressure sensor while the pressurized storage tank is emptying;
    detect when a rate of decrease of the fluid pressure fall below a threshold; and
    record a pressure value as a remaining pre-charge value of the pressurized storage tank when the threshold is reached.

9. The controller of claim 8, the computer-executable instructions further configure the processor to compare the remaining pre-charge value of the pressurized storage tank to the pre-charge of the pressurized storage tank to measure pre-charge degradation of the pressurized storage tank.

10. The controller of claim 7, wherein the computer-executable instructions further configure the processor to establish system settings based on the pre-charge of the pressurized storage tank.

11. The controller of claim 10, wherein the system settings include a pressure cycle range within which the controller maintains the fluid pressure of the pressurized storage tank.

12. The controller of claim 11, wherein the pressure cycle range is 2 psig above the pre-charge of the pressurized storage tank to 22 psig above the pre-charge of the pressurized storage tank.

13. A system, comprising:
    a tank configured to store a fluid and provide the fluid under pressure to a plumbing system; and
    a controller configured to control operation of a pump to supply the fluid to one of the tank or the plumbing system, wherein the controller is operatively coupled to the pump and a pressure sensor that provides a pressure reading for the system,
    wherein the controller is configured to:
        activate the pump to initiate a filling operation;
        obtain pressure readings from the pressure sensor to monitor a change of pressure during the filling operation;
        detect a step change in the monitored pressure, wherein the step change is detected when a rate of change of the pressure exceeds a predetermined rate; and record a pressure value at an upper end of the step change as an initial pre-charge of the tank.

14. The system of claim 13, wherein the controller is further configured to:
disable pressure-based control of the pump;
monitor a rate of change of pressure with the pressure sensor while the tank is emptying;
detect when the rate of change of pressure while the tank is emptying falls below a threshold; and
record a pressure value when the threshold is reached as a remaining pre-charge of the tank.

15. The system of claim 14, wherein the controller is further configured to compare the remaining pre-charge of the tank with the initial pre-charge of the tank to measure pre-charge degradation of the tank.

16. The system of claim 13, wherein the controller is further configured to establish pressure setpoints for pressure-based pump control based on the initial pre-charge of the tank.

17. The system of claim 16, wherein the pressure setpoints include a cut-in pressure and a cut-out pressure for the pump.

18. The system of claim 17, wherein the controller sets the cut-in pressure to be 2 psig above the initial pre-charge of the tank and sets the cut-out pressure to be 22 psig above the initial pre-charge of the tank.

\* \* \* \* \*